Patented Aug. 13, 1929.

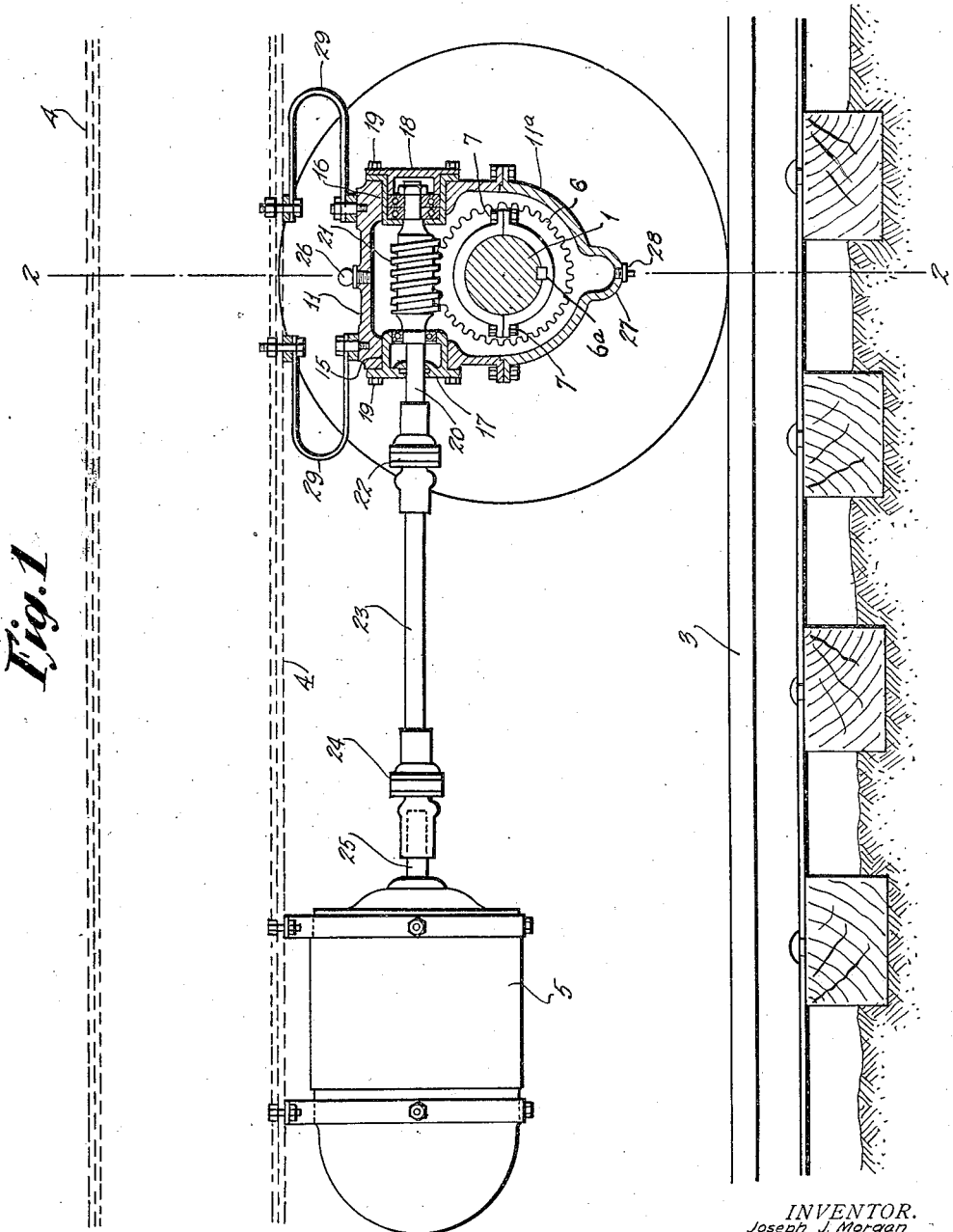

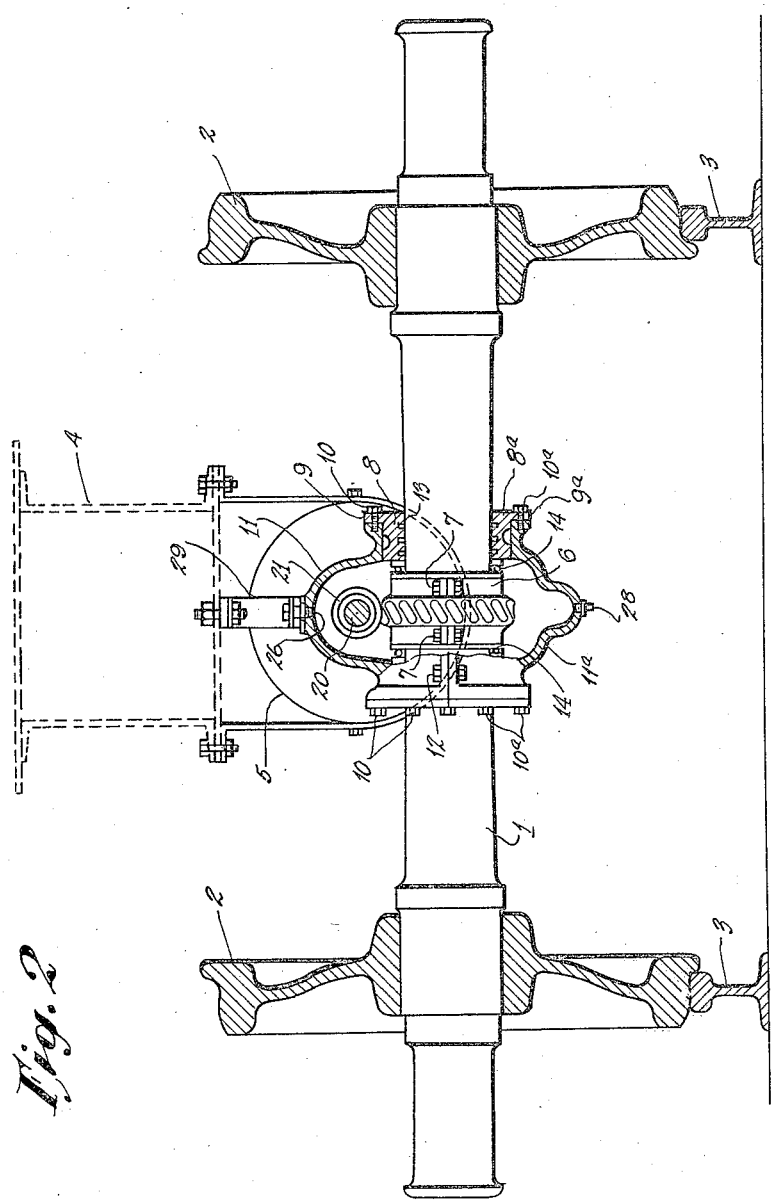

1,724,502

UNITED STATES PATENT OFFICE.

JOSEPH J. MORGAN, WILLIAM E. DICKINSON, AND WALTER J. BITTERLICK, OF NEW HAVEN, CONNECTICUT.

DIRECT DRIVE FOR RAILWAY AXLE LIGHTING EQUIPMENT.

Application filed February 8, 1928. Serial No. 252,929.

This invention relates generally to railway axle lighting equipment. In the railway arts, it is the common practice to mount a generator on the under side of the car. The armature shaft of the generator is provided with a pulley and the car axle is also provided with a pulley. These pulleys are encircled by a belt and as a result movement of the car brings about operation of the generator for the purpose of generating current to be used in lighting the car. Storage batteries or accumulators are generally utilized in this connection. This method of car lighting has been used for years and in every case the generator has been driven from the car axle through belt connections. These belt connections are the source of continual labor and expense required in their upkeep. The belts are, in practice, in exposed position beneath the cars and dust, dirt, grit and other extraneous matter accumulates upon the belt and pulleys, so that the wear on the belt is particularly rapid. The life of a belt used in the open and for the purposes stated is relatively short and these belts have to be renewed frequently at considerable cost. Furthermore, it is not uncommon for gravel to be thrown from the road bed into the belts thereby causing breakage or serious damage to the apparatus.

These disadvantages have long been recognized by those engaged in railway maintenance, and numerous attempts have been made to eliminate the belt drive to which we have referred. All suggested devices have, however, proved impractical for various reasons and as a result the belt drive is still commonly used for the purposes stated. The employment of a direct, positive drive between a car axle and a generator involves numerous problems. For example, the axle rotates on its own axis due to turning movement of the wheels as the car traverses the track and such axle also swings bodily on the vertical axis of the king pin of the truck, so that in order to produce a direct mechanical connection between the axle and the generator, a highly flexible construction is necessary to compensate for the widely varying positions of which the respective parts are rapidly changing with respect to one another in ordinary operation of the car.

The object of this invention is to provide a practical and efficient direct drive between the axle and the generator and exhaustive experimentation and research has proven this may be accomplished through the employment of a shaft connected to the armature shaft of the generator and extending into proximity with the axle. This shaft includes universal joints and on the shaft is positioned a gear adapted to mesh with a gear mounted on the axle. The two gears are kept in mesh by means of a housing which serves to completely house and conceal these gears and at the same time forms a bearing for the shaft. The housing is mounted upon the axle, but is precluded from turning by a yieldable connection with the car frame, which serves to take the driving strains off of the shaft and still permits free rotation of the axle upon the axis of the king pin of the truck.

It is absolutely essential in a device of the character under consideration that the parts be so constituted as to enable a quick repair or replacement in the advent of breakage. For example, if a train moves into a station and comes to a stop with lights in one of the cars out, it is highly desirable, in fact necessary to proper railway maintenance that the necessary repair be made within a few minutes while the train is standing at the station. In the old belt drive arrangement, breakage of the belt can be readily repaired by slipping a new belt in place. In all direct drive mechanisms heretofore suggested however quick repair or replacement of the parts has been impossible and this is one of the several reasons why these former devices have not met with favor.

Another purpose of the present invention therefore is to provide for the quick demountability of all parts of the drive so as to enable repair or replacement to be made quickly and easily. The present invention conforms with these requirements in a simple and efficient manner.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 shows the present invention associated with a railway car. In this view the axle is shown in section as is also the casing in which the gears are mounted.

Figure 2 is a section on the line 2—2 of Figure 1 with certain parts of the casing shown in section.

Referring to the drawing, 1 indicates the axle and 2 the wheels which are adapted to traverse a railway track 3. 4 designates the center beam of the car and 5 the generator with its usual electrical connections incident to the lighting system of the car.

The parts thus far described are conventional and form no part of the present invention, except when used in combination with structure presently to be explained.

Mounted at the center of the axle is a sectional gear 6. This gear is made in two sections adapted to collectively embrace the axle and to be rigidly secured in place by bolts 7. This gear is preferably keyed to the axle, as shown at 6$^a$. Directly adjacent the opposite faces of the split gear hub, the axle is preferably machined to give good bearing surfaces and these surfaces are embraced by secondary bearings 8 and 8$^a$, each of which is substantially semicylindrical. The sections 8 and 8$^a$ are provided with flanges 9 and 10$^a$ which are perforated to permit bolts or screws to be passed therethrough. The sections 8 are secured by means of bolts or screws 10 to the upper section 11 of a housing and the sections 8$^a$ are secured by bolts or screws 10$^a$ to the lower section 11$^a$ of the housing. These housing sections are in turn secured together in a position to embrace the axle by bolts 12. The parts are so constructed that when the housing sections are bolted to one another and to the sections 8 and 8$^a$, a rigid assembly will be produced and in this housing assembly, the axle is free to rotate while the housing remains stationary. If desired, packing rings or material may be positioned in annular grooves 13 formed in the sections 8 and 8$^a$, so as to permit the housing to be filled with lubricant and to preclude such lubricant from leaking out between the sections 8 and 8$^a$ and the axle. Split thrust bearings 14 are preferably positioned between the inner ends of the sections 8 and 8$^a$ and the hub of the gear 6 to centralize the housing with respect to the gear 6.

The upper section of the housing is provided at its front and back with openings 15 and 16 and in these openings are adapted to be positioned cages 17 and 18. These cages are secured to the section 11 of the housing by means of bolts or screws 19 and within these cages are formed suitable bearings adapted to support a stub shaft 20. On this stub shaft is fixed a worm 21 and the pitch of this worm is relatively great, so that when in mesh with the gear 6 which has a like pitch, the gear is adapted to drive the worm. The bearings in the cages are constituted to properly support the shaft 20 and to take up axle thrust incident to the drive of this shaft from the gear 6. The exterior end of the shaft 20 is connected by means of a universal joint 22 to a connecting shaft 23 and the opposite end of the connecting shaft is connected by a universal joint 24 to the armature shaft 25 of the generator 5. Furthermore, the connections between the armature shaft 25 and the universal joint 24, as well as between the connecting shaft 23 and the universal joint 22 are slidable connections made by fitting the polygonal end of the respective shafts into correspondingly shaped sockets in the universal joint, so that universal movement is not only provided for, but sufficient elongation of the driving connections is permitted to allow turning movement of the car truck without disconnecting or imposing strain on the parts. The cages 17 and 18 are made sufficiently tight with respect to the housing that the housing is practically oil tight and lubricant may be introduced into the housing through a plugged opening 26 so that all the operating parts within the housing will work in the lubricant.

It will be noted from the drawings that the lowermost part of the housing section 11$^a$ is provided with a sump 27 adapted to receive metallic chips or other extraneous matter resulting from wear. This foreign matter may be removed from time to time through the plugged opening 28. The upper section 11 of the housing is connected to the center beam 4 of the car by means of U shaped springs 29, the opposite ends of which are bolted to the respective parts. These springs serve to maintain the casing in upright position while permitting of turning movement of the axle about the king pin of the truck and thus remove from the shaft connections between the gear 21 and the generator turning stresses which might otherwise be brought about through rotation of the wheels on the axis of the axle 1. In other words, the axle drives the shaft 20 through the gears 6 and 21 and the casing is meanwhile held in proper position to assure correct driven relation without rotation of the casing by the springs 29. The springs are, however, sufficiently yielding to permit the truck to turn on its vertical axis.

The structure which we have described is relatively simple mechanically. The parts are so associated that they can be readily dismantled with ease and expedition in order to substitute new parts in case of excessive wear or breakage. All of the working parts of the construction are housed within the dust proof casing and are flooded with working oil so that wear is minimized. In the event of necessity for replacement a few bolts may be released to open the casing and to allow of the removal of any worn or broken part.

Experience has shown, however, that the possibility of breakage or serious wear is highly remote for the reason that the mechanical principles incorporated in the construction are theoretical and practically sound. An important feature of the invention resides in the fact that a positive drive is provided for the generator and it is further possible in making new installations to utilize a generator of smaller capacity than heretofore generally employed. When a belt drive is used, slippage must naturally be calculated for and it is the practice to provide a much larger generator than is required for the work in order that sufficient current will be generated in spite of slippage which invariably results. Furthermore, the structure of this invention, while slightly more expensive to install initially is ultimately much more economical than well known belt drives. Belts of the kind now generally used are approximately 20 feet in length and the lives of such belts are relatively short so that when replacement is figured, the cost is appreciably higher over long periods than is the case with the present invention. The invention may be installed upon cars now in use without material change in the car parts and after installation requires a very little maintenance attention.

The foregoing detailed description sets forth the invention in its preferred, practical form, but the invention is to be understood as fully commensurate with the appended claims.

Having thus fully described the invention, what we claim as new and desire to secure by Letters Patent is:

1. In drive mechanism for railway lighting equipment, a car having a body frame and a truck in which an axle is journalled, a generator supported on the car, in combination with a drive shaft connected to the generator shaft, gearing connections between the drive shaft and the axle, a casing enclosing and housing said gearing connections, and at least one spring operatively connecting the casing to the body frame to preclude rotation of the casing on the axis of the axle.

2. In drive mechanism for railway lighting equipment, a car having a body frame and a truck in which an axle is journalled, a generator supported on the car, in combination with a drive shaft connected to the generator shaft, gearing connections between the drive shaft and the axle, a casing enclosing and housing said gearing connections, and connections between the frame of the car body and the casing for precluding rotary movement of the casing about the axis of the axle.

3. In drive mechanism for railway lighting equipment, a car having a body frame and a truck in which an axle is journalled, and a generator supported on the car, in combination with a drive shaft connected to the generator shaft, gearing connections between the drive shaft and the axle, a casing enclosing and housing said gearing connections, and connections between the frame of the car body and the casing for precluding rotary movement of the casing about the axis of the axle, said connections being yieldable to permit the casing to turn with the axle on a vertical axis as the car traverses a curve of the track.

4. In drive mechanism for railway lighting equipment, a car having a body frame and provided with a truck in which an axle is journalled, and a generator mounted on the body frame, in combination with a split gear clamped around and keyed to the axle, a casing enclosing said gear, means for securing the casing to the body frame to preclude rotary movement of the casing on the axis of the axle, a shaft mounted for rotation on the casing, a worm fixed on said shaft interiorly of the casing and meshing with the gear on the axle, and operative driving connections between said shaft and the shaft of the generator.

5. In drive mechanism for railway lighting equipment, a car provided with a truck in which an axle is journalled, and a generator mounted on the car structure, in combination with a split gear clamped around and rigid with the axle, a casing enclosing said gear, means for securing the casing to the car structure preclude rotary movement of the casing on the axis of the axle, a shaft mounted for rotation on the casing, a worm fixed on said shaft interiorly of the casing and meshing with the gear on the axle, and shafting connections including universal joints and slidable connections between said shaft and the generator shaft.

6. In drive mechanism for railway lighting equipment, a car provided with a truck embodying an axle, and a generator mounted on the car structure, in combination with a split gear removably attached to the axle for rotation therewith, a casing enclosing said gear, a stub shaft mounted on the casing, a worm meshing with the gear and fixed on the stub shaft within the casing, a driving shaft interposed between the shaft of the generator and the stub shaft and provided with universal joints, and sliding connections with the latter shafts, and at least one spring operatively connecting the casing and the car structure to preclude rotation of the casing on the axis of the axle.

7. In drive mechanism for railway lighting equipment, a car provided with a truck embodying an axle, and a generator mounted on the car structure, in combination with a split gear removably attached to the axle for rotation therewith, a casing enclosing said gear, a stub shaft mounted on the casing, a worm meshing with the gear and fixed on the stub shaft within the casing, a driving shaft interposed between the shaft of the generator and the stub shaft and provided with universal joints, sliding connections with the latter shafts, and a plurality of leaf springs operatively connecting the casing and the car structure to preclude rotation of the casing on the axis of the axle.

8. In drive mechanism for railway lighting equipment, a car provided with a truck embodying an axle, and a generator mounted on the car structure, in combination with a split gear removably attached to the axle for rotation therewith, a casing enclosing said gear, a stub shaft mounted on the casing, a worm meshing with the gear and fixed on the stub shaft within the casing, a driving shaft interposed between the shaft of the generator and the stub shaft and provided with universal joints, sliding connections with the latter shafts, a plurality of substantially U shaped leaf springs, each of which is connected at one of its ends to the car structure and at its opposite end to the casing to preclude rotation of the casing about the axis of the axle while permitting rotation of the truck on its vertical axis.

9. In drive mechanism for railway lighting equipment, a car having a body frame and provided with a truck in which the axis is journalled, a worm gear rigidly secured to the axle against relative rotation thereby, a generator mounted on the body frame with its shaft in substantially horizontal tangential relation with the gear on the axle, a worm positioned in substantial alinement with the axle of the generator and meshing with the top portion of the gear on the axle, a substantially horizontal shaft having a universal joint therein and connecting the shaft with the worm to partake of a substantially horizontal position, a casing mounted on the axle and enclosing the gear and worm and forming a mounting for the work, and resilient connections between the casing and the body frame of the car.

10. In drive mechanism for railway lighting equipment, a car having a body frame and provided with a truck in which an axle is journalled, a generator mounted on the car frame and having associated therewith a drive shaft extending horizontally in a plane above the axle, a gear secured to said shaft, a gear secured to the axle and meshing with the gear on the shaft, a casing enclosing both of said gears, and connections between the casing and the body frame to preclude rotation of the casing on the axis of the shaft.

In testimony whereof we have signed the foregoing specification.

JOSEPH J. MORGAN.
WILLIAM E. DICKINSON.
WALTER J. BITTERLICK.